Patented Aug. 29, 1950

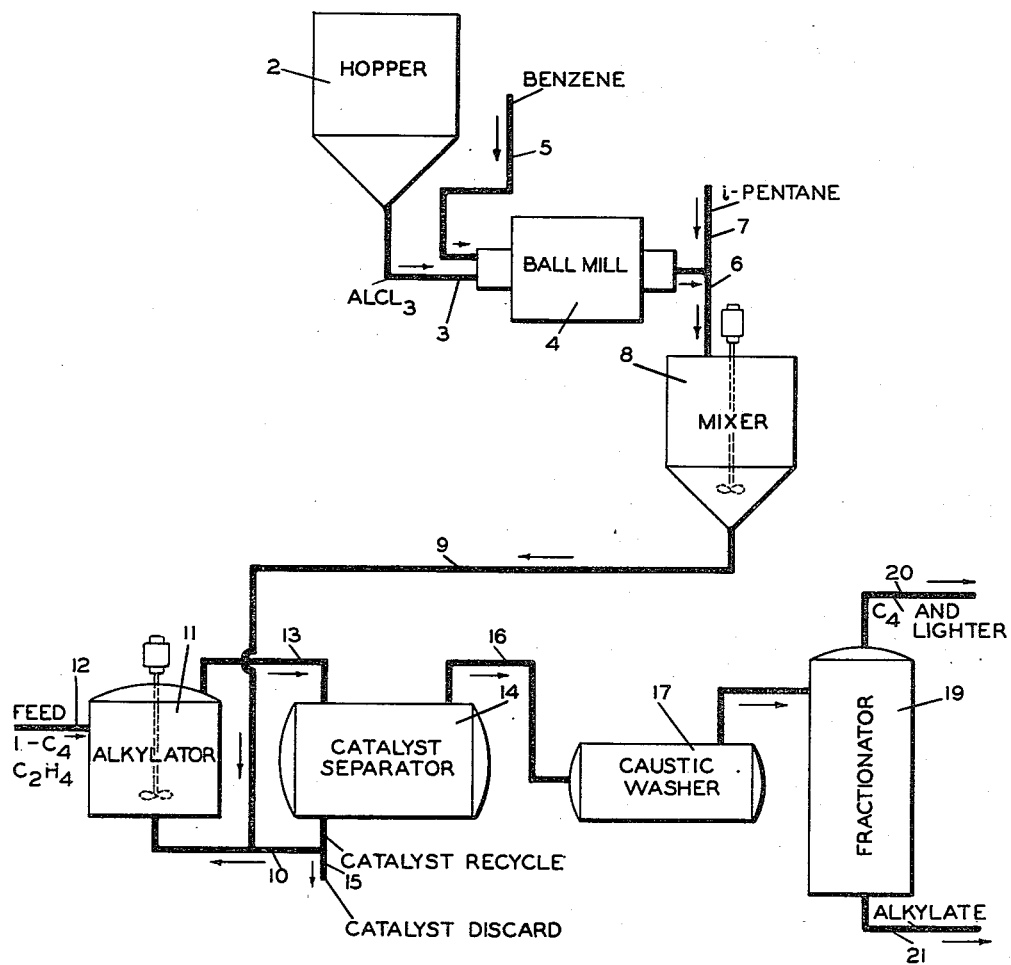

2,520,439

UNITED STATES PATENT OFFICE 2,520,439

WET GRINDING PROCESS

Howard R. Sailors, Bartlesville, Okla., assignor to Phillips Petroleum Company, a corporation of Delaware Application October 8, 1945, Serial No. 621,071

11 Claims. (Cl. 252—429)

This invention relates to the manufacture of disperse systems of solid and liquid. More particularly this invention relates to the manufacture of suspensions of metal halides such as suspensions of metal halide catalysts and their manner of use in catalytic processes.

Metal halide catalysts are commonly utilized in a wide variety of organic reactions such as cracking hydrocarbons, polymerization of olefins, isomerization of hydrocarbons, alkylation of paraffins and/or aromatic hydrocarbons with olefins or alkyl halides, condensation of the Friedel-Crafts type, and the like. Aluminum halides, particularly aluminum chloride and aluminum bromide, are perhaps the most commonly used of these catalysts, and aluminum chloride may be considered to represent this group of materials in the description of the invention herein.

It has been found advantageous in a number of processes to utilize metal halides such as aluminum chloride in the form of certain complex addition compounds which exist in liquid phase, for example, aluminum chloride hydrocarbon complex formed by reaction of aluminum chloride with paraffinic hydrocarbons, olefins, diolefins, and the like to form liquid products. The most useful of the liquid complexes are those formed with paraffinic hydrocarbons, especially those formed with more or less highly branched normally liquid paraffin hydrocarbons boiling in the boiling ranges of those fractions generally identified as gasoline and kerosene.

In utilizing these complexes as catalysts in a hydrocarbon reaction such as alkylation or isomerization, for example, the liquid complex is usually circulated through a system which comprises a reaction zone and separatory means in which catalyst complex is separated from reactants and products and recycled to the reaction zone. In order to maintain the activity of the catalyst, it is necessary to introduce periodically or continuously activating metal halide into the system. In order to obtain efficient mixing of metal halide with the recycled catalyst complex and to permit ready handling and proportioning of the fresh activating metal halide, it has been found desirable to introduce the metal halide in the form of a slurry. It has also been found, however, that when such slurries are prepared in the usual manner, substantial settling of the metal halide occurs with the result that uniform introduction and redispersion of the aluminum chloride are prevented. Furthermore, after partial settling or after standing, the settled metal halide cakes and becomes difficult to pump and redisperse.

In accordance with the present invention an improved method for dispersing such metal halides through the use of a particular dispersing medium has been discovered which permits the production of dispersions having a slow rate of settling and which will permit handling and introduction of metal halide without substantial settling prior to dispersion in the catalyst complex. Furthermore, any settling which does occur does not form cakes and the settled material is readily redispersed and pumped to any desired point in the system.

It is an object of this invention to provide a process for dispersing solid material in liquid media. It is another object of the present invention to provide an improved method for dispersing metal halides and an improved dispersion of such metal halides having a slow rate of settling. It is a further object of the present invention to disperse metal halide catalyst in a novel liquid organic medium with the result that a catalyst dispersion having an extremely low rate of settling is obtained. It is another object of the present invention to provide a metal halide reaction system utilizing the novel catalyst suspensions referred to.

Particle size reduction of solids is a well-known art. Numerous types of grinding apparatus are used in such operations; among these types are ball mills, pebble mills, rod mills, colloid or dispersion mills, and many others. Two different ways of carrying out milling operations are commonly practiced, these being dry grinding and wet grinding. Those skilled in the art are familiar with these two general types of grinding, so no explanation is required.

It is with wet grinding that this invention is concerned, and particularly with wet grinding in which a slurry or suspension of solid material is obtained.

Wet grinding in mills of the types previously named is usually more efficient than dry grinding. In wet grinding, for example, in a ball mill, reduction of particle size is accomplished by the impact of the balls on solid material between two balls colliding. A further means of reduction of particle size is in the sliding of one ball across another with solid material between. This sliding action is more effective in a liquid of proper viscosity. If the liquid is of too low viscosity, the hydraulic shear exerted on the particles by the liquid is not great. Improper liquid viscosity may also result in balling of the solid particles so a cushioning effect is exerted on the impact between balls, resulting in decreased particle size reduction.

By the practice of my invention, the composition of the liquid used in the grinding operation is that in which the grinding is most efficiently conducted and the composition of the liquid in the disperse system is adjusted after the grinding operation by the addition of a liquid of composition different from that used in the grinding operation.

Applicant has discovered that, although paraffinic hydrocarbons boiling in the range of naphtha or kerosene will form liquid complexes at room temperature with finely divided metal halides such as aluminum chloride, such complexes will not form from metal halides and low boiling paraffins having 4–6 carbon atoms at room temperature or below. Thus paraffins such as the butanes, pentanes and hexanes may be suitable suspending media for the preparation of metal halide slurries to serve as refortifying compositions for use in metal halide complex catalyst systems. Applicant has, however, also discovered that such paraffinic hydrocarbons do not serve as the most efficient media in which grinding of the metal halide can be carried out in that fine suspensions are not as readily obtained as may be desired and the degree of dispersion for a given power consumption is not as fine as is desirable. Furthermore, such paraffins are not in themselves suitable as suspending media since dispersions therein settle at too rapid a rate to permit proper utilization of the slurry in such a reaction system as is desired herein, and after such settling does occur, cakes of metal halide form which are not readily redispersed.

Applicant has further discovered, however, that the presence of benzene in slurries composed of $C_4$–$C_6$ paraffins and metal halide will retard the rate of settling and will also prevent caking of the metal halide and permit ready pumping of such slurries. It has also been discovered that benzene itself is a desirable medium in which metal halides may be ground and dispersed and that metal halides suspended in benzene alone will settle at a very slow rate so that such suspensions may be used in refortifying complex catalysts. Also such suspensions on settling will not form cakes and may be readily redispersed. At the same time, while alkyl aromatics such as toluene will themselves form complexes with metal halides, at ordinary temperatures benzene will not. Thus it is one aspect of the present invention to grind metal halides in benzene and form dispersions thereof, and to utilize such dispersions in refortifying complex catalysts. In general, however, unless benzene is a reactant in the process, it is not preferred to utilize benzene alone as a suspending medium in view of its relatively high cost and because benzene tends to dissolve in the complex and cause dilution thereof.

The $C_4$–$C_6$ paraffins do not form complexes with metal halides at the temperatures at which they would be prepared and utilized and may, therefore, be utilized as suspending media provided they have incorporated therewith a minimum proportion of benzene. Applicant has discovered that in the presence of at least 20 per cent by volume of benzene settling of metal halides is appreciably retarded, caking of settled suspension is prevented, and the settled material is readily and uniformly redispersed thus permitting handling in pumping apparatus. Thus applicant's invention includes the use of benzene alone as a suspending medium for finely divided metal halides, or of mixtures of benzene and $C_4$–$C_6$ paraffins containing at least 20 per cent benzene, for this purpose. Suitable paraffins include normal butane, isobutane, n-pentane, isopentane, n-hexane and isohexanes.

The invention may be illustrated by reference to the accompanying drawing which is a schematic flow diagram of one arrangement of apparatus suitable for practicing the invention in connection with an aluminum chloride catalyzed alkylation process.

Anhydrous aluminum chloride contained in hopper 2 passes through conduit 3 to ball mill 4. Benzene enters ball mill 4 through conduit 5. The weight ratio of aluminum chloride to benzene entering ball mill 4 may vary somewhat but is preferably about 1:1. In ball mill 4, the aluminum chloride is ground to the desired degree of fineness, which is conveniently determined as follows:

A sample of the effluent from ball mill 4 is diluted with benzene to such an extent that the diluted slurry contains about 25 weight per cent aluminum chloride. Into a 100-ml. mixing cylinder is placed enough of the diluted slurry to give a liquid column about 15 cm. in height. The slurry is then mixed thoroughly in the mixing cylinder and allowed to stand. The aluminum chloride is considered sufficiently fine, in accordance with this invention, when it settles not more than 4 to 5 cm., preferably not more than 2 to 3 cm., in 20 minutes.

Aluminum chloride-benzene slurry passes from ball mill 4 through conduit 6 to mixer 8, which may be any desired type of mixing vessel provided with suitable agitation means. Liquid isopentane enters the system through inlet 7 and is passed through conduit 6 to mixer 8, in which it is thoroughly mixed with the aluminum chloride-benzene slurry. The proportion of isopentane added is preferably controlled so that the slurry obtained in mixer 8 contains about 15 to 45 weight per cent aluminum chloride. The aluminum chloride-hydrocarbon slurry obtained in mixer 8 is passed through conduit 9 and through catalyst recycle conduit 10 to alkylator 11. In conduit 10, the slurry is mixed with aluminum chloride-hydrocarbon complex catalyst used in the alkylation system described hereinafter.

Hydrocarbon feed, comprising isobutane and ethylene, preferably in a molar ratio of 4:1 to 20:1 enters alkylator 11 through inlet 12. In alkylator 11, which is provided with suitable agitation means, the hydrocarbon feed is intimately mixed with liquid aluminum chloride-hydrocarbon complex, which is used as the alkylation catalyst. The temperature in alkylator 11 is preferably about 25° to 75° C. The pressure is that necessary to maintain the reactants in the liquid state. The volume ratio of catalyst to hydrocarbon is approximately 1:2. After a suitable residence time, preferably 5 to 30 minutes, the mixture of reactant hydrocarbons and catalyst is passed through conduit 13 to catalyst separator 14 in which the heavier or catalyst phase separates from the lighter or hydrocarbon phase. Part of the catalyst is withdrawn from catalyst settler 14 and recycled through recycle conduit 10. The remainder is withdrawn from the system through outlet 15. By proper adjustment of the amounts of aluminum chloride-hydrocarbon complex catalyst withdrawn through outlet 15 and of activating aluminum chloride-hydrocarbon slurry added through conduit 9, as already described, the activity of the catalyst in alkylator 11 is maintained at the desired value.

The hydrocarbon phase is passed from catalyst settler 14 through conduit 16 to caustic washer 17, in which it is contacted with an alkali such as aqueous sodium hydroxide to remove any remaining traces of aluminum chloride. The washed hydrocarbon phase is then passed to fractionator 19. An overhead fraction comprising butanes and lighter hydrocarbons is withdrawn from fractionator 19 through outlet 20. Isobutane may be separated from this fraction and recycled to alkylator 11 by means not shown in the drawing. Debutanized alkylate, comprising mainly hydrocarbons that boil in the gasoline boiling range, is withdrawn from fractionator 19 through conduit 21.

In an operation such as is described above it is desired to maintain the activity of an aluminum chloride-hydrocarbon complex alkylation catalyst by addition of $AlCl_3$ to the catalyst in the reaction zone. As the reaction zone operates at 400 pounds pressure, this addition is best accomplished by pumping the aluminum chloride into the reaction zone in the form of a slurry. This slurry is preferably slow settling and made from hydrocarbons which are not harmful to the alkylation reaction and do not readily react with the aluminum chloride. It is also desirable that any of the aluminum chloride settling, for example, in piping carrying the slurry at such times as flow through these pipes is stopped, should be easily redispersed. A suspension of fine aluminum chloride in benzene and isopentane has these requirements, the presence of benzene rendering easily dispersible any of the aluminum chloride settling; a slurry of fine aluminum chloride in isopentane only, settles to give a cake very difficult to redisperse by agitation.

In one typical example, a slurry containing about 2.5 pounds $AlCl_3$ per gallon, in a liquid composed of 61 volume per cent isopentane and 39 volume per cent benzene, was desired. The grinding of the $AlCl_3$ was conducted in a pebble mill with the benzene alone present. The particle size of the individual $AlCl_3$ particles in the ground material was found to be 3 microns or less in diameter. At the conclusion of the grinding operation, the slurry was removed and the desired amount of isopentane added, the final liquid of the slurry being about 40 volume per cent benzene and 60 volume per cent isopentane. A sample of the slurry produced was placed in a mixing cylinder, the height of the sample being seventeen centimeters. In two minutes, the $AlCl_3$ had settled six millimeters.

A second slurry of substantially the same composition was produced by grinding the $AlCl_3$ for substantially the same length of time in a mixture of 61 volume per cent isopentane and 39 volume per cent benzene. In duplication of the settling test for the first slurry, the aluminum chloride in this second slurry settled twelve millimeters in two minutes. This demonstrates the improved dispersion when grinding in benzene alone.

Both of the slurries described above were allowed to reach maximum settling. The settled aluminum chloride was very easily redispersed by agitation, thus demonstrating the effect of benzene in promoting redispersion of the suspension.

A slurry of about 2.5 pounds of $AlCl_3$ per gallon of isopentane was produced by grinding the $AlCl_3$ in the isopentane for about 8 hours in the same type of mill described in connection with the slurries wherein benzene was present. In a duplicate settling test the slurry settled 20 millimeters in two minutes. This rate of settling is too rapid to permit satisfactory use in refortifying catalyst in the process as described herein. After maximum settling was reached, the settled $AlCl_3$ was found to have formed a cake and could not be readily redispersed by agitation.

I claim:
1. A method for dispersing an aluminum halide catalyst in a suspending medium to provide a catalyst suspension having a retarded rate of settling which comprises grinding said aluminum halide in benzene to obtain aluminum halide of the desired particle size, and incorporating in the resulting dispersion a sufficient quantity of a suspending medium selected from the class consisting of benzene and $C_4$–$C_6$ paraffins to provide a mixture containing at least 20 per cent by volume of benzene.

2. A method according to claim 1 wherein the $C_4$–$C_6$ paraffin is a pentane.

3. A method according to claim 1 wherein the $C_4$–$C_6$ paraffin is isopentane and the aluminum halide is aluminum chloride.

4. A method according to claim 1 wherein the suspending medium is benzene.

5. A method for preparing an aluminum halide catalyst suspension having a retarded rate of settling which comprises grinding said aluminum chloride in benzene to obtain aluminum halide of the desired particle size, and incorporating in the resulting dispersion a suspending medium selected from the class consisting of benzene and $C_4$–$C_6$ paraffins in proportions such that benzene amounts to at least 20% by volume of the suspending liquid.

6. A method for dispersing solid aluminum chloride catalyst in a suspending medium to provide a catalyst suspension having a retarded rate of settling, which comprises grinding aluminum chloride in benzene to finely divided form and suspending the same in a mixture of benzene and a $C_4$–$C_6$ paraffin wherein the benzene amounts to at least 20 volume per cent of the final mixture.

7. A method according to claim 6 wherein the suspending medium consists of a mixture of about 60 volume per cent isopentane and 40 volume per cent benzene.

8. A method according to claim 6 wherein the $C_4$–$C_6$ paraffin is a pentane.

9. The method of claim 6 in which the final slurry contains aluminum chloride in the range of 15 to 45 weight per cent of the slurry.

10. The process of claim 6 wherein said grinding is continued until a sample of the ground aluminum chloride dispersed in benzene so as to contain 25 weight per cent aluminum halide and introduced into a 100 ml. cylinder to a depth of 15 cm. settles to a depth not exceeding 5 cm. in 20 minutes.

11. The process of claim 6 wherein said grinding is continued until the particle size of said aluminum halide does not exceed 3 microns in diameter.

HOWARD R. SAILORS.

REFERENCES CITED

The following references are of record in the file of this patent:

UNITED STATES PATENTS

| Number | Name | Date |
| --- | --- | --- |
| 2,146,667 | Atwell | Feb. 7, 1939 |
| 2,236,099 | Ipatieff et al. | Mar. 25, 1941 |
| 2,250,118 | Smithuysen | July 22, 1941 |
| 2,259,457 | Croll | Oct. 21, 1941 |
| 2,265,548 | Schuit | Dec. 9, 1941 |
| 2,308,560 | Carmody et al. | Jan. 19, 1943 |
| 2,395,680 | Nysewander et al. | Feb. 3, 1946 |
| 2,406,778 | Kruse et al. | Sept. 3, 1946 |

OTHER REFERENCES

Protective and Decorative Coatings, vol. III, Mattiello, J. Wiley & Sons, 1943, page 282.